United States Patent
Wang et al.

(10) Patent No.: US 6,732,939 B1
(45) Date of Patent: May 11, 2004

(54) POWER-BASED CONTROL METHOD FOR A VEHICLE AUTOMATIC CLIMATE CONTROL

(75) Inventors: Mingyu Wang, Amherst, NY (US); John Lawrence Pawlak, III, Orchard Park, NY (US); Charles Andrew Archibald, Lockport, NY (US); John M. Kirchberger, Gasport, NY (US)

(73) Assignee: Delphi Technologies, Inc., Troy, MI (US)

( * ) Notice: Subject to any disclaimer, the term of this patent is extended or adjusted under 35 U.S.C. 154(b) by 0 days.

(21) Appl. No.: 10/392,010

(22) Filed: Mar. 19, 2003

(51) Int. Cl.[7] ................................................. F24F 7/00
(52) U.S. Cl. ..................................... 236/49.3; 236/780
(58) Field of Search ........................... 236/49.3, 78 D, 236/91 C; 62/244, 180, 202, 203

(56) References Cited

U.S. PATENT DOCUMENTS

| | | | |
|---|---|---|---|
| 5,400,963 A | 3/1995 | Ishikawa et al. | 236/49.3 |
| 5,603,226 A | 2/1997 | Ishikawa et al. | 62/182 |
| 5,832,990 A | 11/1998 | Eisenhour | 165/202 |
| 5,988,517 A | 11/1999 | Bauer et al. | 236/49.3 |
| 5,995,889 A | 11/1999 | Eisenhour | 701/36 |
| 6,173,902 B1 | 1/2001 | Bauer et al. | 236/49.3 |
| 6,234,398 B1 * | 5/2001 | Pawlak, III et al. | 236/91 C |
| 6,434,958 B1 * | 8/2002 | Koors et al. | 62/176.1 |
| 2002/0095942 A1 * | 7/2002 | Koors et al. | 62/176.1 |
| 2003/0204292 A1 * | 10/2003 | Wang et al. | 701/1 |

* cited by examiner

*Primary Examiner*—Marc Norman
(74) *Attorney, Agent, or Firm*—Patrick M. Griffin

(57) ABSTRACT

A motor vehicle automatic climate control computes the HVAC power requirement for cabin air temperature regulation, and determines corresponding air discharge temperature and blower motor speed commands using a two-step table look-up procedure. Nominal air discharge temperature and blower motor speed profiles are tabulated as a function of a Power Index generally corresponding to ambient temperature, and used along with the set temperature to form a table of HVAC power requirement vs. Power Index. In vehicle operation, the HVAC power requirement vs. Power Index table is used to retrieve a Power Index corresponding to the computed HVAC power requirement, and the air discharge temperature and blower motor speed tables are then used to retrieve air discharge temperature and blower motor speed commands based on the retrieved Power Index.

4 Claims, 5 Drawing Sheets

US 6,732,939 B1

POWER-BASED CONTROL METHOD FOR A VEHICLE AUTOMATIC CLIMATE CONTROL

TECHNICAL FIELD

This invention relates to an automatic climate control for a vehicle heating, ventilation and air-conditioning (HVAC) system, and more particularly to a method of regulating HVAC control parameters based on an estimate of the heating or cooling power required to maintain the vehicle cabin temperature at a set temperature selected by a vehicle occupant.

BACKGROUND OF THE INVENTION

In general, an automatic climate control system controls the HVAC control parameters (such as discharge air velocity, temperature and location) based on a desired cabin temperature (referred to herein as the set temperature) and a number of easily measured or estimated parameters such as the outside air temperature, the actual cabin air temperature, and the solar intensity. If the HVAC control parameters are correctly determined, the cabin air temperature will be brought into conformance with the set temperature and then maintained approximately equal to the set temperature despite variations in outside temperature and solar intensity.

Although various methods have been developed for determining the HVAC control parameters, the most physically-based approach is one in which the required heating or cooling effort is estimated based on a thermal loading model for the cabin, and appropriate control parameters for providing the required heating or cooling effort are then selected. The thermal loading model will typically include an ambient component characterizing heat transfer between the cabin and the outside air, a deep mass or core component characterizing heat transfer between the cabin air and the core elements of the cabin (seats, floor mass, etc.), and a solar component characterizing the net solar radiation into the cabin. When the ambient and core temperatures are referenced to the set temperature, the sum of the above-mentioned heat transfer components represents the heating or cooling effort required to maintain the cabin air temperature at the set temperature. In most cases, the required heating or cooling effort may be satisfied by any of a number of different combinations of discharge air temperature and velocity, and the control must include some method of determining which of the potential combinations of discharge air temperature and velocity is most appropriate.

Representative examples of the above-described control approach are disclosed in the U.S. Pat. Nos. 5,400,963 and 5,603,226 to Ishikawa et al., U.S. Pat. Nos. 5,988,517 and 6,173,902 to Bauer et al., and U.S. Pat. Nos. 5,832,990 and 5,995,889 to Eisenhour. Although the controls described in these patents embody a physical basis for determining the required heating or cooling effort under steady-state conditions, the determination of the corresponding discharge air temperature and velocity is time-consuming and/or calculation intensive. Accordingly, what is needed is a simple and efficient method of carrying out a physically based climate control.

SUMMARY OF THE INVENTION

The present invention is directed to an improved motor vehicle automatic climate control method which computes the HVAC power requirement for cabin air temperature regulation, and determines corresponding air discharge temperature and blower motor speed commands using a two-step table look-up procedure. Nominal air discharge temperature and blower motor speed profiles are tabulated as a function of a Power Index generally corresponding to ambient temperature, and used along with the set temperature to form a table of HVAC power requirement vs. Power Index. In vehicle operation, the HVAC power requirement vs. Power Index table is used to retrieve a Power Index corresponding to the computed HVAC power requirement, and the air discharge temperature and blower motor speed tables are then used to retrieve air discharge temperature and blower motor speed commands based on the retrieved Power Index. The HVAC power requirement vs. Power Index table may be designed to accommodate different set temperatures, or the table values may be re-calculated during vehicle operation whenever the set temperature is changed.

BRIEF DESCRIPTION OF THE DRAWINGS

FIG. 5 is a main flow diagram, FIG. 6 details a portion of the main flow diagram pertaining to determining steady-state values of blower motor speed and air discharge temperature, FIG. 7 details a portion of the main flow diagram pertaining to resetting a transient starting temperature during quasi-steady-state control, and FIG. 8 details a portion of the main flow diagram pertaining to overshoot logic during quasi-steady-state control.

DESCRIPTION OF THE PREFERRED EMBODIMENT

Figure 1:
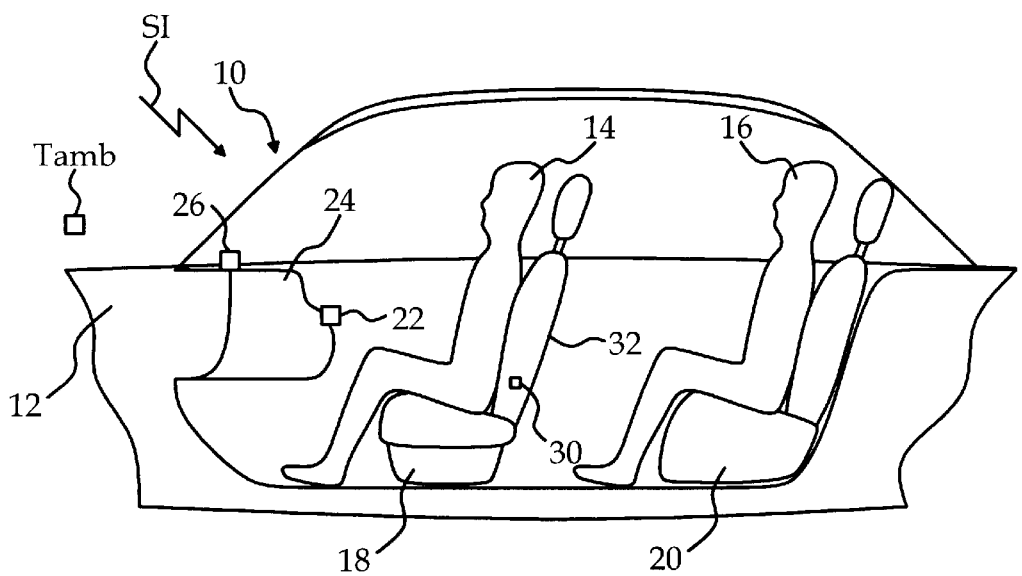
FIG. 1 depicts the cabin of a motor vehicle, and the measured or estimated temperature locations according to this invention.

Referring to FIG. 1, the reference numeral 10 generally designates the passenger compartment or cabin of a motor vehicle 12, in which occupants 14, 16 are seated in front and rear seats 18, 20. The temperature of the air in cabin 10, referred to herein as $T_{cabin}$, is typically measured at a convenient location such as in the region 22 of instrument panel 24, although $T_{cabin}$ may alternatively be estimated, as disclosed for example in the U.S. Pat. No. 6,234,398, assigned to Delphi Technologies, Inc. Apart from the actions of the vehicle's climate control system, $T_{cabin}$ is influenced by three primary factors: the temperature $T_{amb}$ of the ambient or atmospheric air, the solar intensity (SI), and the temperature $T_{deep}$ of the deep mass components of the cabin 10. Other factors, such as the heat produced by the occupants 14, 16 and the heat transferred to the cabin 10 by the vehicle engine and exhaust system, are typically negligible and can be ignored. The ambient temperature $T_{amb}$ is easily measured with a suitably placed thermistor, and the solar intensity SI may be measured by one or more suitably placed sensors 26, as is well known in the art. The deep mass components include the seats 18, 20, the instrument panel 24, the cabin doors, carpeting and floor, etc., and according to this invention, and it has been found that $T_{deep}$ may accurately and reliably measured by a thermistor 30 located on the seat back frame 32 of front seat 18.

Figure 2:
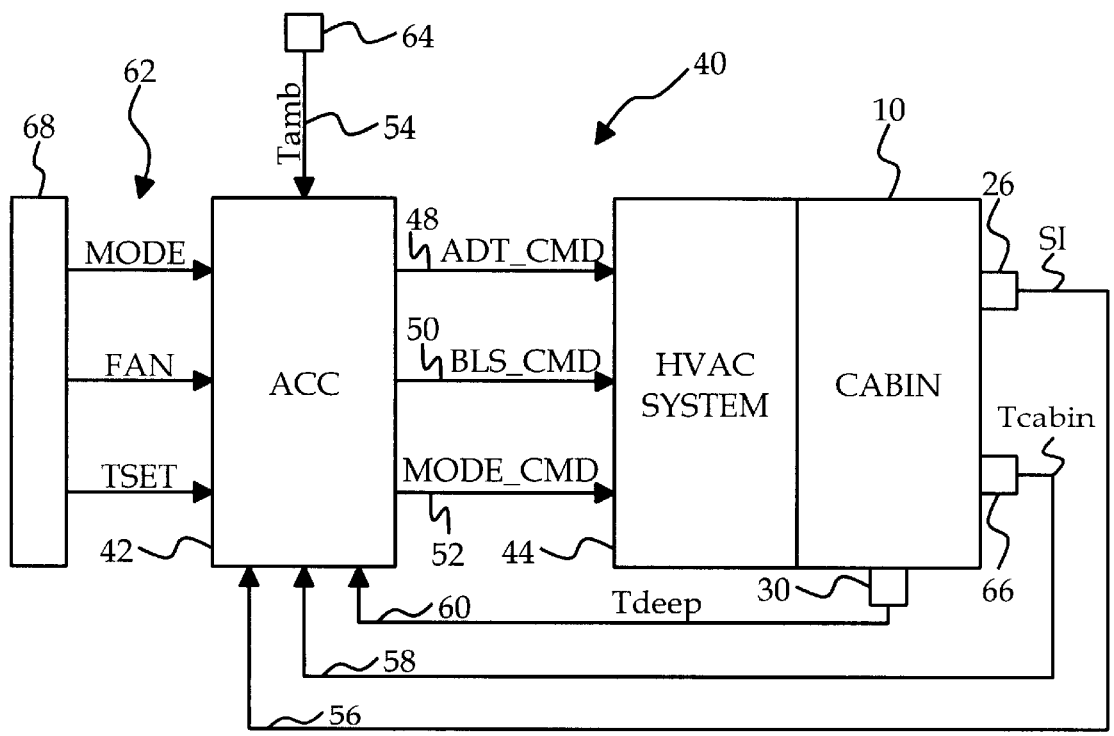
FIG. 2 is a diagram of an automatic climate control system according to this invention, including a microprocessor-based automatic climate controller.

Referring to FIG. 2, the reference numeral 40 generally designates an automatic climate control system of vehicle 12 for regulating the cabin air temperature according to this invention. The system includes a microprocessor-based automatic climate controller (ACC) 42, and a heating, ventilation and airconditioning (HVAC) system 44 adapted to deliver conditioned air to the cabin 10. The controller 42 is responsive to various inputs for developing and outputting a set of climate control commands for the air discharge temperature (ADT_CMD), blower motor speed (BLS_CMD), and air discharge mode (MODE_CMD) on lines 48, 50 and 52. The inputs include ambient temperature $T_{amb}$ on line 54, solar intensity SI on line 56, cabin temperature $T_{cabin}$ on line 58, deep mass temperature $T_{deep}$ on line 60, and a number of occupant-generated inputs as generally designated by the reference numeral 62. Sensors 64, 66, 30, 26 for developing the inputs $T_{amb}$, $T_{cabin}$, $T_{deep}$ and SI may be purely conventional. The occupant-generated inputs 62 are generated by an operator interface panel 68 located in instrument panel 24, and include a set temperature (TSET), and manual overrides for the blower speed (FAN) and the air discharge mode (MODE).

The HVAC system 44 includes various elements of a conventional automotive HVAC system, and responds to the commands on lines 48, 50, 52 in a conventional fashion. For example, HVAC system 44 includes a refrigerant compressor which may be driven by the vehicle engine and a heater core which may be coupled to the engine coolant. A control mechanism is employed for regulating the heater core coolant flow and/or the compressor capacity and/or air mix control doors to satisfy the air discharge temperature command (ADT_CMD) on line 48. The air discharged into cabin 10 is generated by a blower driven by a blower motor, and a control circuit drives the blower motor to satisfy the blower motor speed command (BLS_CMD) on line 50. A set of mode control doors and a control mechanism for positioning the mode control doors is employed to satisfy the mode command (MODE_CMD) on line 52.

As indicted above, ACC 42 executes a climate control algorithm to produce the climate control commands ADT_CMD, BLS_CMD, MODE_CMD. In the illustrated embodiment, the inputs $T_{amb}$, $T_{cabin}$, $T_{deep}$ and SI are used along with set temperature TSET to solve a steady-state energy balance equation for the required heating or cooling effort, and ACC 42 selects a suitable combination of ADT_CMD and BLS_CMD for satisfying the required effort.

The required heating or cooling effort, referred to herein as the HVAC power ($PWR_{hvac}$), is given according to the product:

$$PWR_{hvac}=(FR_{discharge}*c_p)(ADT-TSET) \quad (1)$$

where $FR_{discharge}$ and ADT represent the mass flow rate and temperature, respectively, of the discharge air, and $c_p$ is the specific heat of air. As described below, this relationship is used to determine blower speed and air discharge temperature settings for a given set temperature TSET and computed HVAC power requirement $PWR_{hvac}$. The HVAC power requirement $PWR_{hvac}$ is defined by the passenger compartment heat load, which is given by the expression:

$$UA_{cabin}(TSET-T_{amb})+UA_{deep}(TSET-T_{deep})-LOAD_{solar} \quad (2)$$

where $UA_{cabin}$ is a thermal conductance term characterizing heat transfer between the ambient air and the cabin air, $UA_{deep}$ is a thermal conductance term characterizing heat transfer between the various deep mass components of the vehicle and the cabin air, and $LOAD_{solar}$ is a solar heating term based on the measured solar intensity SI. The thermal conductance terms $UA_{cabin}$ and $UA_{deep}$ can be determined experimentally or heuristically for any given vehicle type.

Figure 3:
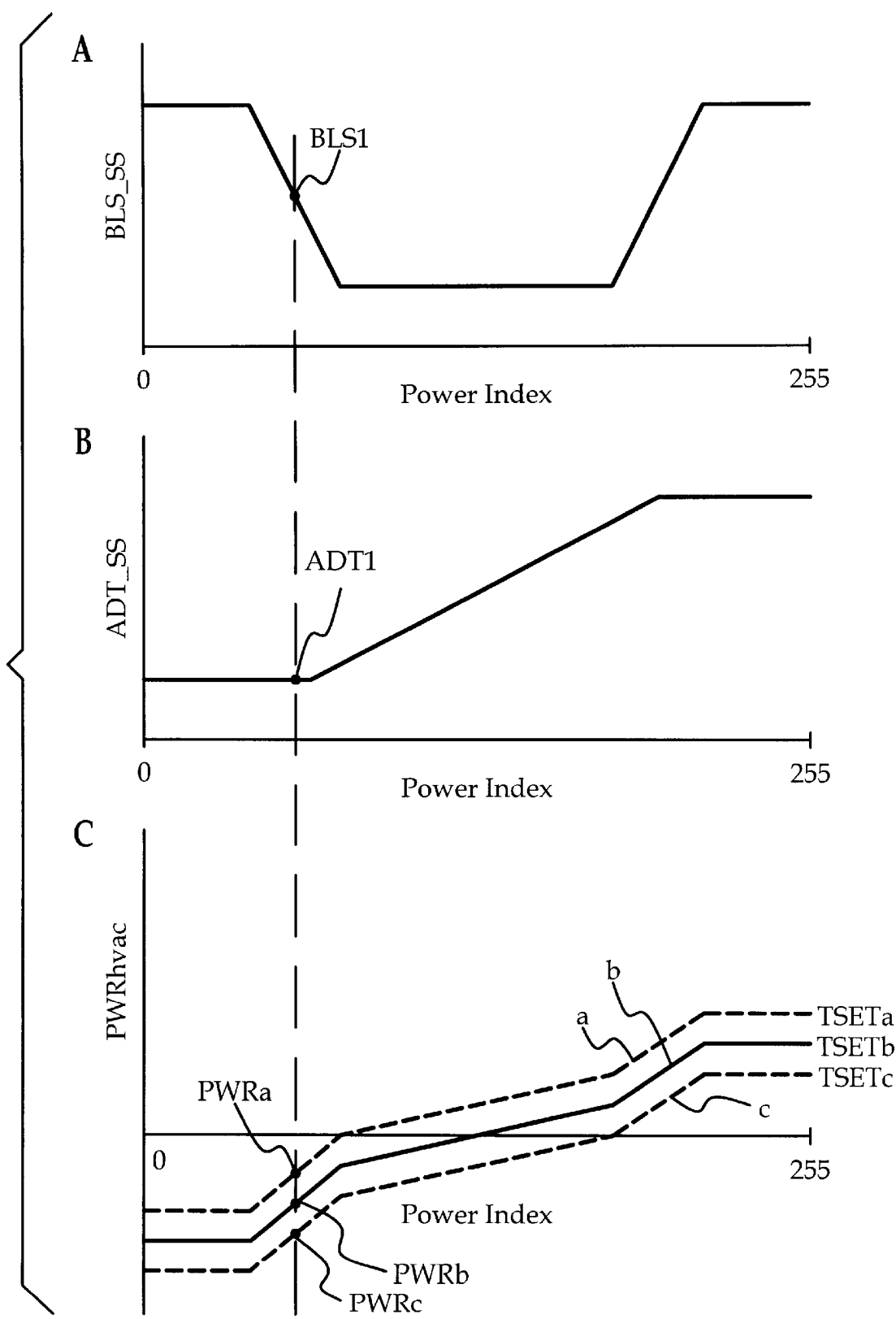
FIG. 3, Graphs A–C, depict a table look-up method for determining control parameters for the climate control system of FIG. 2 according to this invention. Graph A depicts blower motor speed as a function of a Power Index, Graph B depicts air discharge temperature as a function of the Power Index, and Graph C depicts a relationship between the Power Index and the required heating or cooling power for controlling the cabin temperature at the set temperature.

According to this invention, HVAC control parameters (air discharge temperature and blower speed) corresponding to the computed power requirement $PWR_{hvac}$ are determined by a convenient table look-up procedure based on $PWR_{hvac}$ and TSET. Referring to FIG. 3, Graphs A and B respectively depict nominal steady-state blower motor speed (BLS_SS) and air discharge temperature (ADT_SS) profiles as a function of a variable referred to herein as the Power Index. The Power Index can be approximately correlated with the ambient temperature $T_{amb}$; in the illustrated embodiment, Power Index has a range of 0 to 255, corresponding, for example, to an ambient temperature range of about 120° F. to about –40° F. The traces a, b and c of Graph C correlate the HVAC power requirement $PWR_{hvac}$ to the Power Index for different set temperatures $TSET_a$, $TSET_b$, $TSET_c$, and are derived from Graphs A and B using equation (1). For example, the blower motor speed BLS1 and discharge temperature ADT1 from Graphs A and B are used along with the set temperatures $TSET_a$, $TSET_b$ and $TSET_c$ to compute three corresponding HVAC power requirements $PWR_a$, $PWR_b$ and $PWR_c$ using equation (1). If desired, Graph C may be reduced to one trace that is recalculated each time TSET changes. In the illustrated embodiment, recalculating the $PWR_{hvac}$ vs. Power Index trace is easily accomplished since the entire trace can be defined by only a small number of breakpoints corresponding to the breakpoints of the air discharge temperature and blower motor speed profiles. In vehicle operation, $PWR_{hvac}$ is computed as described above using equation (2), and corresponding steady-state blower motor speed and air discharge temperature commands are determined by a two-step table look-up. The first step involves looking up the Power Index corresponding to the computed value of $PWR_{hvac}$ (using a table corresponding to Graph C), and the second step involves looking up blower motor speed and air discharge temperature commands corresponding to the Power Index (using tables corresponding to Graphs A and B).

The above-described approach is based on a steady-state understanding of the cabin heat load, and works well under static driving conditions where the ambient temperature and solar intensity are substantially constant. In some driving situations, however, the ambient temperature and solar intensity change quickly and significantly. In such cases, the change is treated as a new steady-state condition, whereas in fact, the change is typically transient in nature. As a result, the control will usually lag the transient, and $T_{cabin}$ will tend to oscillate around TSET. This situation is addressed by transitioning from the normal steady-state control to a quasi-steady-state control when $T_{cabin}$ deviates from TSET by more than a specified amount. Under the quasi-steady-state control, the control parameters are re-initialized based on the extent of the control temperature deviation. The steady-state control parameter values are treated as dynamic target values, and the blower speed and discharge temperature are brought into correspondence with the respective target values based on the degree to which the overall control objective of regulating $T_{cabin}$ at TSET is achieved.

The quasi-steady-state control is carried out with a performance indicator THETA that reflects the degree to which the control has succeeded in bringing $T_{cabin}$ into correspondence with TSET, starting from an initial temperature $T_{start}$, and a transient modifier TMOD for modifying the steady-state control parameters based on THETA. The performance indicator THETA is defined as:

$$\text{THETA} = (T_{cabin} - \text{TSET})/(T_{start} - \text{TSET}) \quad (3)$$

Figure 4:
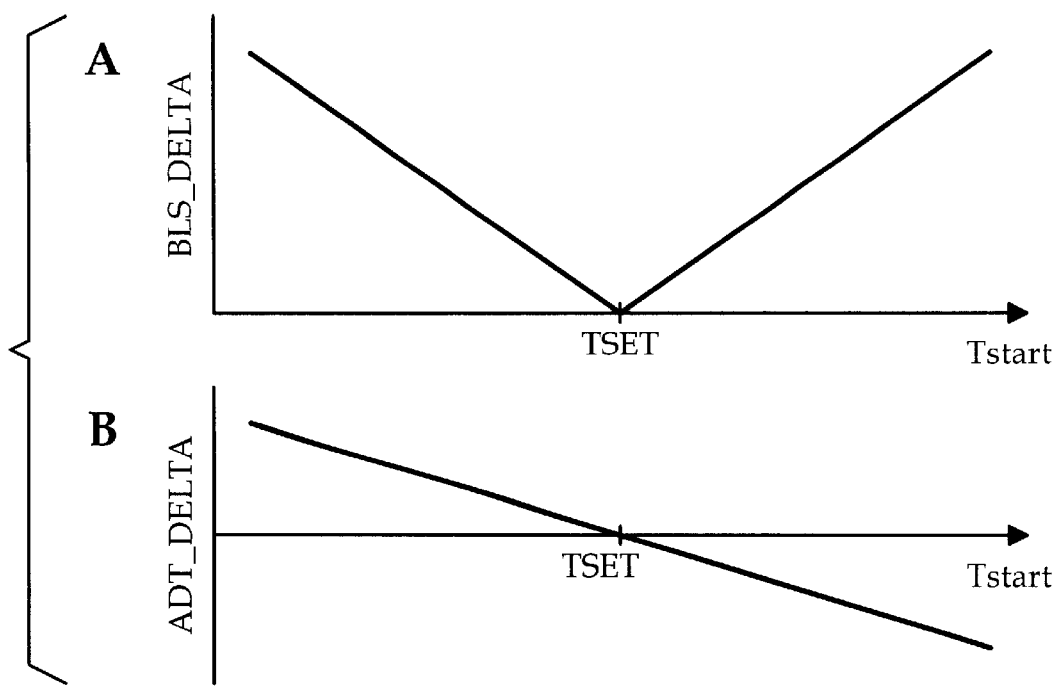
FIG. 4, Graphs A–B, depict blower motor speed and air discharge temperature offsets for transient temperature control.

Upon initiation of the quasi-steady-state control mode, $T_{start}$ is reset to $T_{cabin}$, at which point THETA has as value of one. As $T_{cabin}$ deviates from $T_{start}$ and approaches TSET, THETA decreases, reaching zero when $T_{cabin}$ reaches TSET. While THETA itself could be used to linearly transition between the re-initialized and steady state command values, it has been found that a linear transition usually results in sub-optimal transient performance since vehicle climate control is typically highly non-linear. Accordingly, a better approach is to define a configurable transition so that a system calibration engineer can tailor the transition as required to achieve optimal transient performance. This can be achieved by defining a transient modifier TMOD that is a non-linear function of the performance indicator THETA, and forming the quasi-steady-state control parameter commands BLS_CMD and ADT_CMD as follows:

$$BLS\_CMD = BLS\_SS + (TMOD * BLS\_DELTA) \quad (4)$$

$$ADT\_CMD = ADT\_SS + (TMOD * ADT\_DELTA) \quad (5)$$

where BLS_DELTA and ADT_DELTA are offsets used to re-initialize the blower speed and air discharge temperature when entering the quasi-steady-state control mode, and the transient modifier TMOD is a power function of THETA, as follows:

$$TMOD = THETA^n \quad (6)$$

where the exponent n is chosen to provide the desired response. The offsets BLS_DELTA and ADT_DELTA are based on the peak deviation of $T_{cabin}$ from TSET, as depicted, for example, in Graphs A and B of FIG. 4. Referring to the graphs, BLS_DELTA is illustrated as being proportional to $|(\text{TSET} - T_{start})|$, while ADT_DELTA is illustrated as being proportional to $(\text{TSET} - T_{start})$. Of course, the illustrated linear relationships are merely exemplary, and may be adjusted to suit a particular application. Conveniently, the same approach may be used to control the transient cool-down or warm-up response of the climate control system 40 when the vehicle 10 is started after a prolonged soak period; in this case, $T_{start}$ is initialized at the cabin soak temperature $T_{soak}$, and the variables THETA, TMOD, BLS_DELTA and ADT_DELTA are determined as described above.

Figure 5:
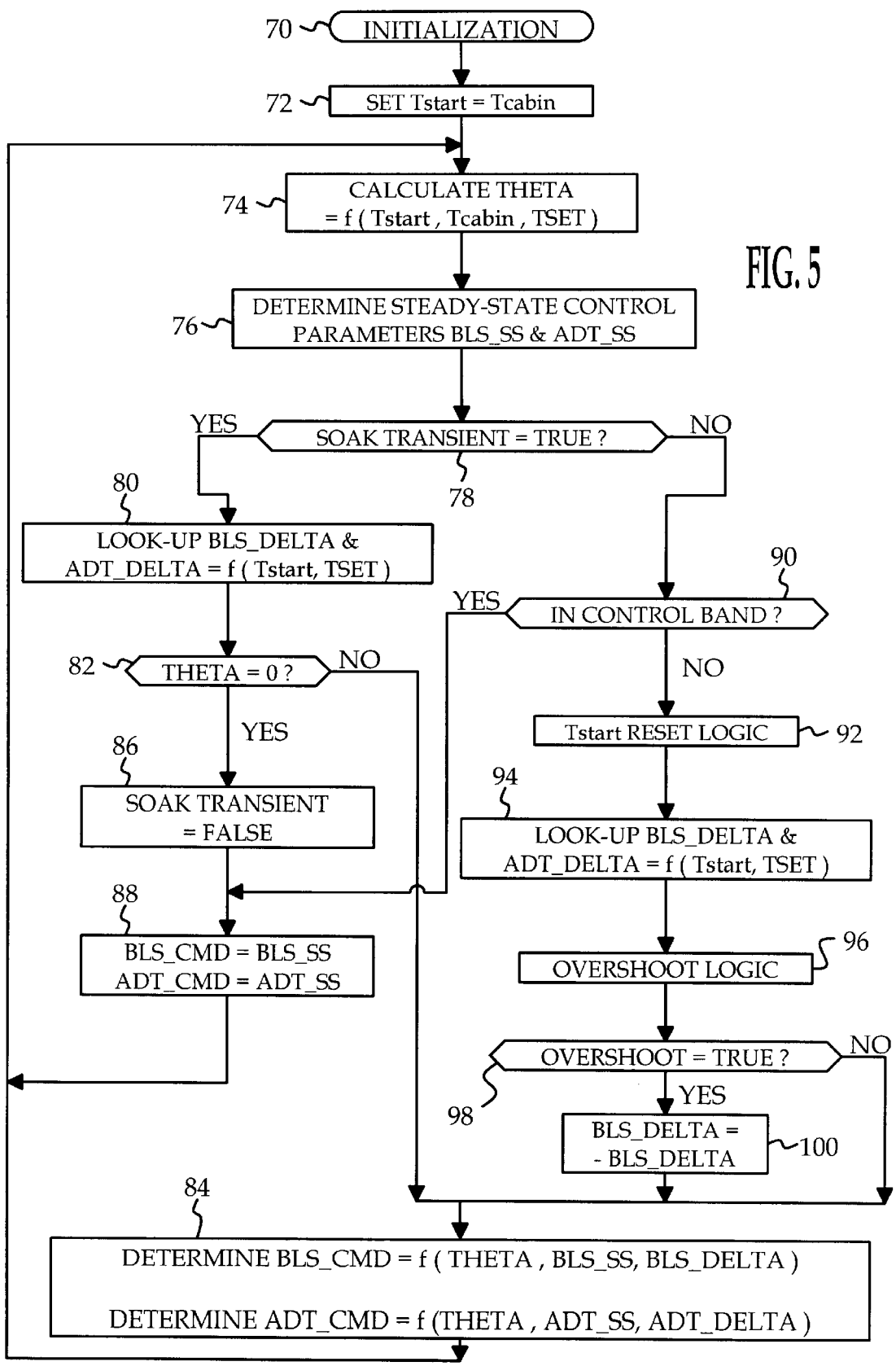

FIGS. 5–8 depict a flow diagram representative of software routine executed by the automatic climate controller 42 of FIG. 2 for carrying out the control of the present invention. FIG. 5 is a main or executive flow diagram, whereas FIGS. 6–8 detail various functional blocks depicted in FIG. 5.

Referring to FIG. 5, the blocks 70 and 72 are executed at system initialization to initialize various flags, variables and outputs to predetermined states, and to set $T_{start}$ equal to the initial cabin temperature $T_{cabin}$ (which is considered to be the cabin soak temperature). Thereafter, the block 74 calculates THETA according to equation (3), and the block 76 determines the steady-state control parameter values BLS_SS and ADT_SS as described more fully by the flow diagram of FIG. 6. Setting $T_{start}$ to $T_{cabin}$ gives THETA an initial value of one, and THETA decreases in successive executions of the routine as $T_{cabin}$ approaches TSET, reaching a value of zero when $T_{cabin}$ reaches TSET.

Figure 6:
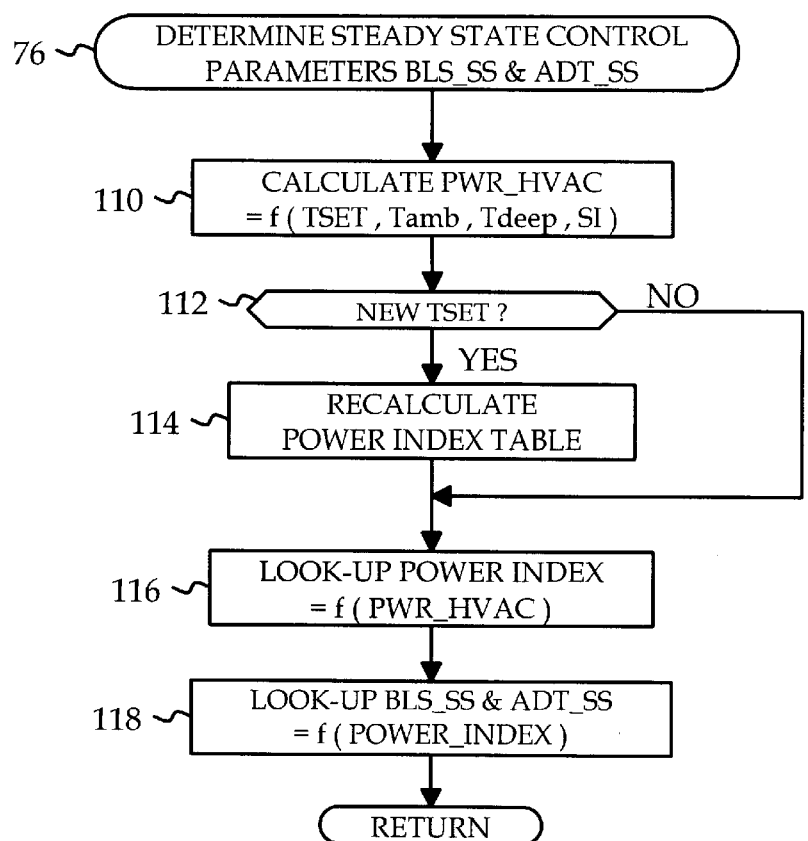
FIGS. 5–8 depict a flow diagram representative of a software routine executed by the automatic climate controller of FIG. 2 for carrying out the control of this invention.

Referring to FIG. 6, determining the steady-state control parameter values BLS_SS and ADT_SS involves essentially four steps. First, the block 110 is executed to calculate the required HVAC power PWR_HVAC using equation (2). Then the blocks 112 and 114 are executed to re-calculate a Power Index table corresponding to Graph C of FIG. 3 if the set temperature TSET has changed. As mentioned above, this involves using equation (1) to compute values of PWR_HVAC based on TSET and stored control parameter values (BLS_SS and ADT_SS) for different Power Index values. The block 116 is then executed to look up a Power Index value (using a table corresponding to Graph C of FIG. 3) based on the calculated value of PWR_HVAC, after which the block 118 is executed to look up the steady-state control parameter values BLS_SS and ADT_SS (using tables corresponding to Graphs A and B of FIG. 3) based on the value of Power Index obtained at block 116.

Referring again to the main flow diagram of FIG. 5, the block 78 determines if a transient warm-up or cool-down is in progress, as indicated by the status of the SOAK TRANSIENT flag. If the status of the flag is True, the block 80 is executed to look up offset values BLS_DELTA and ADT_DELTA based on Tstart and TSET as mentioned above in respect to FIG. 4. Until THETA reaches zero, as determined at block 82, the block 84 is executed to determine the control parameter commands BLS_CMD and ADT_CMD using equations (4), (5) and (6). As indicated, the blocks 74–84 are re-executed to update the above-noted parameters to account for changes in TSET and the various measured temperatures. The performance indicator THETA reaches zero when $T_{cabin}$ reaches TSET. At such point, block 82 is answered in the affirmative, causing block 86 to set the SOAK TRANSIENT flag to False, and the block 88 to set the control parameter commands BLS_CMD and ADT_CMD according to the respective steady-state values BLS_SS and ADT_SS determined at block 76.

Once the transient warm-up or cool-down is completed, the block 78 is answered in the negative, and the block 90 is executed to determine if $T_{cabin}$ is within a control band about the set temperature TSET. If so, the block 88 is executed as described in the preceding paragraph to set the control parameter commands BLS_CMD and ADT_CMD according to the respective steady-state values BLS_SS and ADT_SS determined at block 76. However, if an unexpected transient, such as a change in TSET, SI or $T_{amb}$, causes $T_{cabin}$ to fall outside the control band, block 90 is answered in the negative, and the blocks 92–100 and 84 are executed to activate the quasi-steady-state control mode for bringing $T_{cabin}$ back within the control band. The block 92 designates a routine for appropriately resetting $T_{start}$, as described more fully by the flow diagram of FIG. 7.

Figure 7:
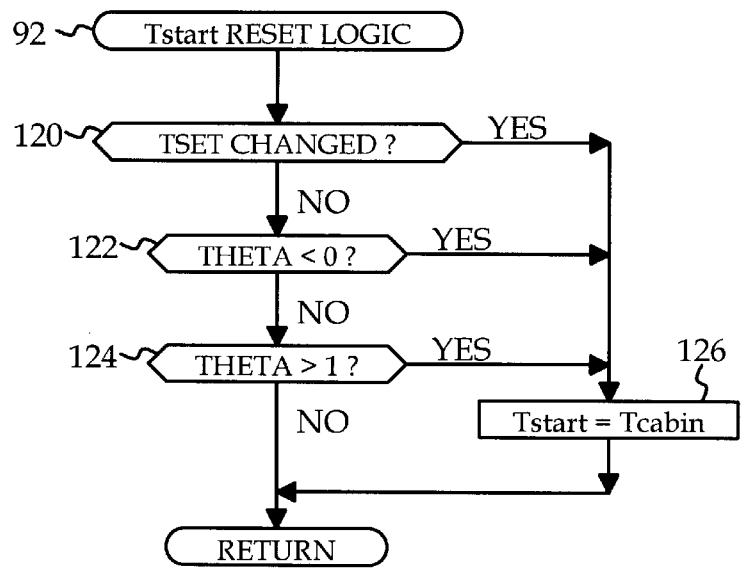

Referring to FIG. 7, the blocks 120–126 serve to appropriately reset $T_{start}$ to the current value of $T_{cabin}$ when a transient condition or a change in TSET causes $T_{cabin}$ to fall outside the control band defined by block 90 of FIG. 5. Each such reset serves to re-initialize THETA to a value of one, whereafter THETA decreases in successive executions of the routine as $T_{cabin}$ approaches TSET, reaching a value of zero when $T_{cabin}$ reaches TSET. The blocks 120 and 126 reset $T_{start}$ to $T_{cabin}$ if TSET has changed; this effectively maintains a minimum difference between $T_{start}$ and TSET, and initializes the quasi-steady-state control mode when $T_{cabin}$ deviates from the control band due to occupant adjustment of TSET. If TSET has not changed, the block 122 determines if THETA is less than zero. This occurs if $T_{cabin}$ overshoots the control band relative to $T_{start}$, and in such cases, the block 126 resets $T_{start}$ to $T_{cabin}$ to initialize the quasi-steady state control mode to drive $T_{cabin}$ back into the control band as explained below. If the overshoot worsens, the value of THETA will exceed one, and the blocks 124 and 126 will reset $T_{start}$ to $T_{cabin}$ in a subsequent execution of the routine; this effectively causes $T_{start}$ to track $T_{cabin}$ until the peak overshoot occurs. If $T_{cabin}$ undershoots the control band relative to $T_{start}$, blocks 122 and 124 are both answered in the negative, and $T_{start}$ remains at its current value.

Following execution of the Tstart Reset Logic, block 94 of FIG. 5 is executed to look up offset values BLS_DELTA and ADT_DELTA based on Tstart and TSET as mentioned above in respect to FIG. 4. Then, the blocks 96–100 are executed to ensure that the control adjusts the blower speed in the correct direction, whereafter the block 84 updates the commands BLS_CMD and ADT_CMD using equations (4), (5) and (6).

Figure 8:
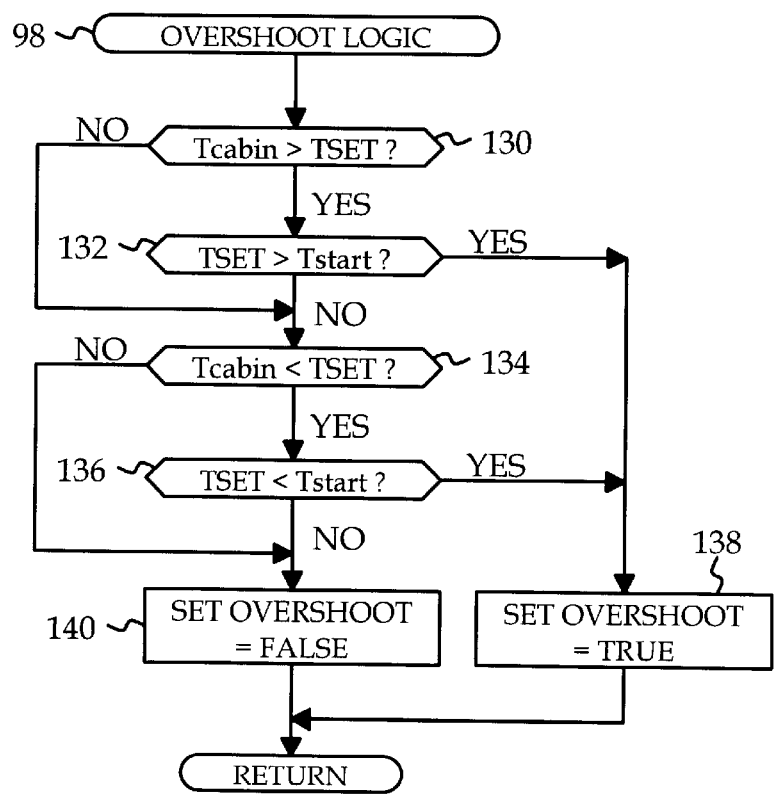

Referring to the Overshoot Logic of FIG. 8, the blocks 130, 132, 134, 136 and 138 set an OVERSHOOT flag to True if $T_{cabin}$ has overshot the control band relative to $T_{start}$. The blocks 130 and 132 detect the condition where $T_{cabin}$ has exceeded the control band and $T_{start}$ is lower than TSET, while the blocks 134 and 136 detect the condition where $T_{cabin}$ has fallen below the control band and $T_{start}$ is higher than TSET; in each case, the OVERSHOOT flag is set to True, and the blocks 98 and 100 of FIG. 5 set BLS_DELTA to a negative value so that the calculations of block 84 produce a reduction in the blower motor speed. If the blocks 130–136 are answered in the negative, block 140 sets the OVERSHOOT flag to False so that the calculations of block 84 produce an increase in the blower motor speed. The need for the OVERSHOOT flag arises due to the uni-polar nature of BLS_DELTA, as described above in reference to Graph A of FIG. 4.

In summary, the control of the present invention provides a simple and easily implemented method of developing HVAC control parameters for producing a calculated HVAC power requirement. While described in reference to the illustrated embodiment, it is expected that various modifications in addition to those suggested above will occur to those skilled in the art. For example, the control may be readily applied to multi-zone configurations, and so on. Accordingly, it should be understood that the scope of this invention is not limited to the illustrated embodiment, and that controls incorporating such modifications may fall within the intended breadth of the appended claims.

What is claimed is:

1. A method of operation for an automatic climate controller that develops HVAC climate control commands for regulating an air temperature in a cabin of a motor vehicle in accordance with an occupant set temperature, comprising the steps of:

tabulating nominal HVAC climate control command profiles as a function of a Power Index generally corresponding to ambient temperature;

tabulating an HVAC power requirement vs. Power Index function based on the nominal HVAC climate control profiles and the set temperature; and in vehicle operation:

computing an HVAC power requirement for regulating the cabin air temperature;

retrieving a Power Index corresponding to the computed HVAC power requirement using the tabulated HVAC power requirement vs. Power Index function; and retrieving HVAC climate control commands based on the retrieved Power Index using the tabulated nominal HVAC climate control command profiles.

2. The method of operation of claim 1, wherein the automatic climate controller includes a blower motor for discharging air into the cabin, and the HVAC climate control commands include a temperature of the discharged air and a blower motor speed.

3. The method of operation of claim 1, including the steps of:

tabulating HVAC power requirement vs. Power Index functions for a number of different possible set temperatures; and in vehicle operation, retrieving a Power Index corresponding to the computed HVAC power requirement using the tabulated HVAC power requirement vs. Power Index function for a current value of the set temperature.

4. The method of operation of claim 1, including the steps of:

detecting a change in the set temperature; and re-tabulating the HVAC power requirement vs. Power Index function when a change in the set temperature is detected.

\* \* \* \* \*